Sept. 9, 1930.  W. R. MYERS ET AL  1,775,597
MACHINE FOR MAKING CONFECTIONS
Filed Dec. 7, 1926   5 Sheets-Sheet 3

INVENTORS
W. R. Myers
B. O. Opitz
BY E. B. Birkenbeuel
ATTORNEY

Sept. 9, 1930.  W. R. MYERS ET AL  1,775,597
MACHINE FOR MAKING CONFECTIONS
Filed Dec. 7, 1926   5 Sheets-Sheet 4

Patented Sept. 9, 1930

1,775,597

UNITED STATES PATENT OFFICE

WILSON R. MYERS AND BERNHARD O. OPITZ, OF PORTLAND, OREGON, ASSIGNORS, BY MESNE ASSIGNMENTS, TO ICE CREAM SMACK CORPORATION, A CORPORATION OF DELAWARE

MACHINE FOR MAKING CONFECTIONS

Application filed December 7, 1926. Serial No. 153,099.

This invention relates generally to the confectioners art, and particularly to the making of a special kind of confection employing a frozen filling.

The first object of this invention is to provide an apparatus for and a method of forming chocolate cylinders and filling same with ice cream.

The second object is to so construct the machine and control the process that a relatively high rate of speed can be maintained in the production of such confections.

The third object is to construct a machine in which the quality, dimensions and thickness of the chocolate cylinders will be exceedingly uniform.

The fourth object is to so combine two necessary operations in the production of the confection as to greatly reduce the size of the machine and to eliminate long conveying systems over which confection must travel while cooling, by utilizing the cold ice cream as a means for congealing and solidifying the chocolate almost instantly after being suitably formed.

The fifth object is to provide a special form of support for the confection molds which will insure the complete coating of the interior of the mold with chocolate and the emptying thereof without unduly smearing the mold or its associated parts.

The sixth object is the utilization of cylindrical paper molds which are held to a true cylindrical form by means of a mold support while the interior of the paper molds is being coated with chocolate and the surplus chocolate removed therefrom and later congealed by the introduction of the filling.

Special reference is had to a class of confections consisting of three principal parts, namely a paper mold in which the confection is formed, a chocolate lining deposited within the mold and a filling within the chocolate.

These, and other objects, will become more apparent from the specification following as illustrated in the accompanying drawing, in which:

Fig. 15 is a diagrammatic section through a chocolate handling cylinder showing parts at the completion of a loading. Fig. 16 shows the same parts in position to admit chocolate to the measuring compartment. Fig. 17 shows the same parts with the measuring compartment completely filled.

Similar number of reference refer to similar parts throughout the several views.

The conveyor

Referring in detail to the drawings, the machine itself is built up on a pair of side frames 30 which are united by the cross ties 31. The upper members 32 of each side frame 30 are preferably in the form of Z bars. A motor 33 is mounted across a pair of ties 31 and furnishes the motive power for the machine.

Over both ends of the machine are mounted the transverse shafts 34 on which are placed the sprocket wheels 35 and around which pass the conveyor chains 36.

Above the conveyor chains 36 and near the middle of the machine is mounted a transverse shaft 37 provided with a sprocket wheel 38 which is driven through a chain 39 on the sprocket 40 which is mounted on the shaft of the motor 33.

On the shaft 37 is secured a crank arm 41 whose connecting rod 42 is joined to the pawl arm 43 which is loosely mounted on the shaft 34. On the arm 43 is mounted a pawl 44 which engages the teeth 45 of the ratchet wheel 46 which, in turn, is secured to the shaft 34, thereby imparting an intermediate movement to the conveyor chains.

Chocolate filler

Over one end of the conveyor is placed an elevated chocolate hopper 47 provided with a water bath 48 to which heat can be applied through the pipe 49. In the base 50 of the hopper 47 are formed a plurality of chocolate measuring pockets 51, preferably in the form of cylinders, in each of which is slidably placed a sleeve 52. Each sleeve 52 has an inlet port 53 which registers with the opening 54 in the bottom of the hopper 47 when the sleeve is in its outermost position. Each sleeve 52 is also provided with an outlet port 55 which registers with the port 56 in the base 50 when the sleeve 52 is in its innermost position. All of the sleeves 52 are joined by the common head 57 to which movement is imparted by the levers 58 which pivot on the rod 59, and each of which levers is provided with two cam lobes 60 between which can operate the cams 61 on the shaft 62, which is driven by the sprocket 63 from the chain 64 which passes over the sprocket 65 on the shaft 37. The shaft 62 passes through a slot 66 in each of the levers 58 which allows them to be moved by the cam 61.

The rod 59 is supported by the side frames 67 which also support the shaft 68 whose pendant arms 69 are joined by the link 70 to the bar 71 which actuates all of the pistons 72 within the sleeves 52. The reduced outer ends 73 of the pistons 72 are preferably guided in the bracket 74, although the pistons 72 can also be operated, as shown in the somewhat diagrammatic views in Figures 15 to 18, namely without a guide for the outer end of the piston.

A rocking movement is imparted to the shaft 68 through the slotted lever 75 whose connecting rod 76 is moved by the crank 77 on the shaft 62. It follows that the rotation of the shaft 62 first causes the port 53 to register with the opening 54 and permits chocolate to flow into the measuring compartment. The outward movement of the piston 72 now actually draws chocolate into the measuring compartment, after which the sleeve is moved to the position shown in Fig. 18, permitting the chocolate to be discharged into the waiting mold under action of the piston 72, but it cannot return to the hopper 47 since its connecting ports 53 and 54 are out of register. This provides not only a rapid flow of chocolate into the molds but always insures the introduction of a definite quantity of molten chocolate therein, and the forced passage of chocolate into and out of each of the measuring cylinders also insures against the stoppage of the ports by foreign matter or by partially congealed chocolate which might find its way into the measuring chamber.

Under the chocolate hopper 47 between the upper and lower runs of the conveyor is a water heated chocolate drip pan 78 from whose lowermost point chocolate 79 is carried by the pump 80 through the pipe 81 back to the hopper 47. The pump 80 is driven by the sprocket 82 and chain 83 from the motor 33. A second drip pan 84 is provided for harder chocolate which last drips from the passing molds. This is ordinarily returned to the melting pot manually, although, of course, it could be incorporated in the main heated drip pan 78, if desired.

Ice cream filler

Over the conveyor and opposite the chocolate filled is the ice cream hopper 85 which is surrounded by a brine tank 86 provided with circulating pipes 87. The discharge mechanism of the ice cream hopper is the same as for the chocolate hopper and the parts thereof are similarly numbered.

Carriers

Figure 4:
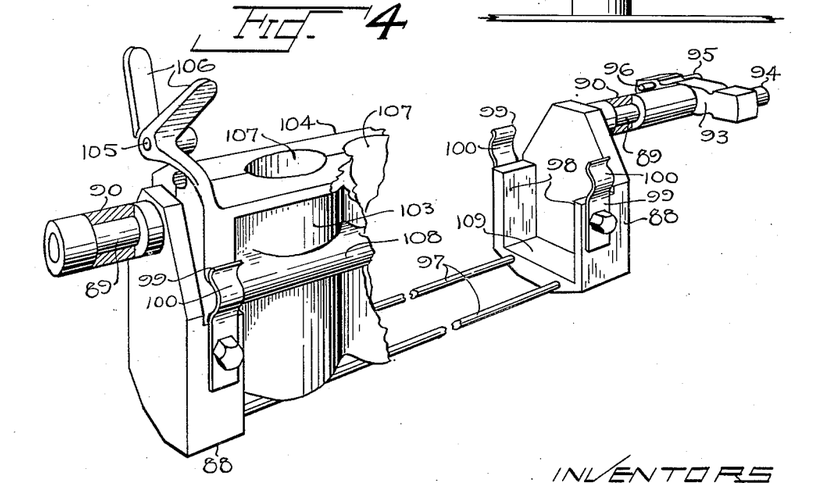
Fig. 4 is a perspective view of a carrier with a mold support in place.
Figure 5:
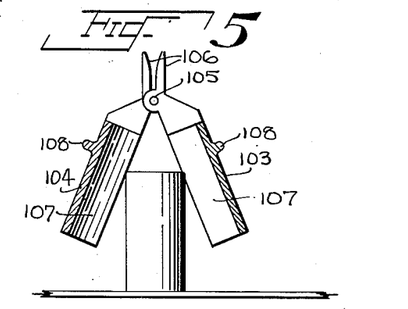
Fig. 5 is a sectional view showing the manner in which the mold support opens to discharge the completed confection, or for reloading with the paper shells or molds.
Figure 6:
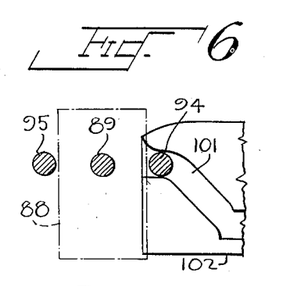
Fig. 6 is a fragmentary view showing the position of the carrier pins and their supporting pivot at the commencement of the tipping operation in which the surplus chocolate is removed from the paper shells or molds.
Figure 7:
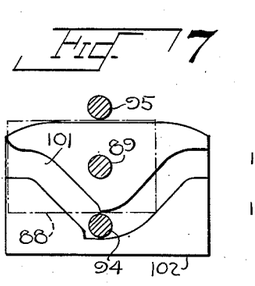
Fig. 7 is a view similar to Fig. 6 showing the position of the carrier pins when the molds are in a horizontal position.
Figure 8:
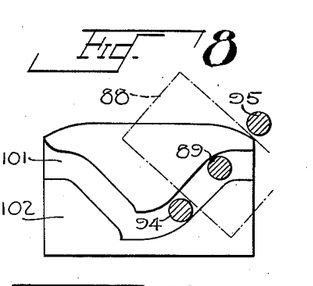
Fig. 8 illustrates the downwardly tipping position and Fig. 9 the completed inverted position.
Figure 9:
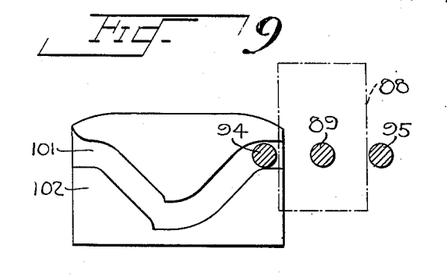
Figure 10:
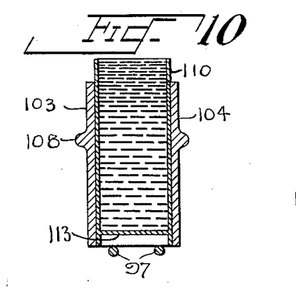
Fig. 10 is a section taken along the line 10—10 in Fig. 1 showing a paper shell confined within the mold support and completely filled with chocolate.
Figure 11:
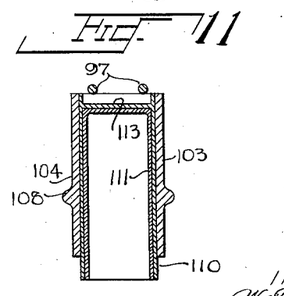
Fig. 11 is a section taken along the line 11—11 in Fig. 1 showing the same parts as in Fig. 10 in an inverted position with the surplus chocolate drained off.
Figure 12:
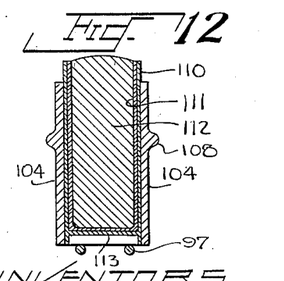
Fig. 12 is a section taken along the line 12—12 in Fig. 1 showing the same parts as in Fig. 11 restored to the upright position and with the chocolate lined paper mold filled with ice cream.

Between the conveyor chains 36 are mounted the carrier frames 88 which normally hang downwardly from their pivots 89, as shown in Fig. 4. The pivots 89 journal in the bearings 90 which are attached to the chain clips 91 by the bolts 92.

The outer end of one pivot 89 of each carrier is provided with a cross arm 93 which is provided with the two outwardly projecting pins 94 and 95 and the inwardly projecting pin 96. The carrier 88 has its ends tied together by the cross rods 97, while its side lugs 98 provide lateral stability for the mold support about to be described.

Spring clips 99 are secured to the sides of the lugs 98 and their curved portions 100 engage suitable projections on the mold supports and prevent same from escaping from the carrier when inclined or inverted.

In order that the mold carrier can be inverted at the desired time a raceway 101 is formed in the block 102, one of which is mounted at the point it is desired to pour off the surplus chocolate, and the second of which is mounted at a point where it is desired to restore the molds to their upright position preparatory to filling same with ice cream. The pins 94 and 95 pass through the raceway 101, as shown in Figures 6 to 9, in order to accomplish the desired purpose.

*Mold support*

The mold support itself consists of two halves 103 and 104 hinged by means of the pivot 105 and provided with the levers 106 by means of which the opposite ends of the mold support may be separated. The halves 103 and 104 have semi-cylindrical recesses 107 formed therein which unite to form open cylinders when the mold support halves are placed into the carrier, as shown in Fig. 4, in which event the ribs 108 drop into the curved portions 100 of the spring clips 99. It will be noted that each end of the mold support rests upon the bottom 109 and that the rods 97 pass across the under side of the cylindrical openings of the mold supports 103 and 104.

*Confection*

The confection itself consists of an outer paper mold 110, a chocolate lining 111 and a filler 112. The construction of the paper molds 110 is more fully described in our copending application Number 171,792. It is sufficient here to say that the molds 110 have one closed end 113 which is a short distance away from the extreme end of the mold which, when placed in a mold support, rests against the rods 97.

*Carrier handling mechanism*

Figure 21:
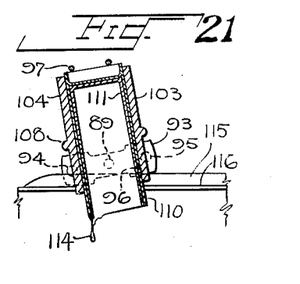
Figure 22:
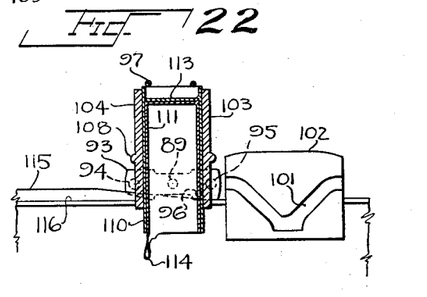
Figure 23:
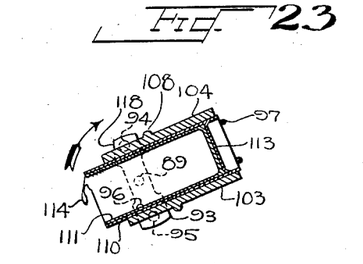
Figure 24:
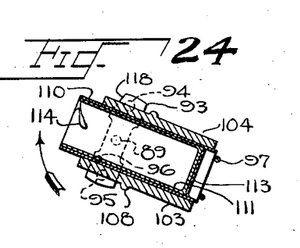
Figure 25:
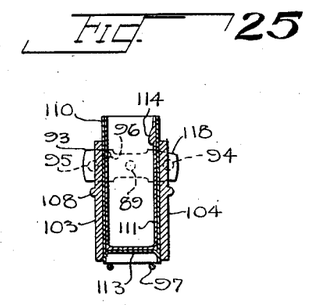

The operation of forming the confection may briefly be described as placing molten chocolate into a paper cylinder open at one end and then pouring off the molten chocolate and then completing the congealing operation while introducing a cold filling. In order to prevent the paper molds from becoming smeared on their outer edges, as well as having a similar condition develop on the mold supports itself, it is found in practice (as illustrated in Figures 19 to 25 inclusive) that by completely overturning the mold the last drop 114 which clings, in many cases, to the rim of the paper mold, will fall back into the inside of the chocolate cylinder instead of smearing up the outer portion thereof. In order that this drop may be collected to one side, the mold is held in a slightly inclined position for a period of its travel, as shown in Fig. 21, after which it is completely turned over leaving the drop 114 deposited on the inside of the cylinder, as clearly shown in Fig. 25.

This seemingly simple but highly important operation is accomplished by means of the pin 96 which rides over the raised member 115 on the track 116 which supports the upper run of the conveyor, the chain 36 traveling in the channel 117, and the cross arm 93 riding on the flat top of the member 116. It will be observed that one face 118 of the arm 93 is cut away, as shown, to permit the desired amount of tilting of the carrier. It will also be observed that the blocks 102 are set in cut-away portions of the member 116.

Figure 13:
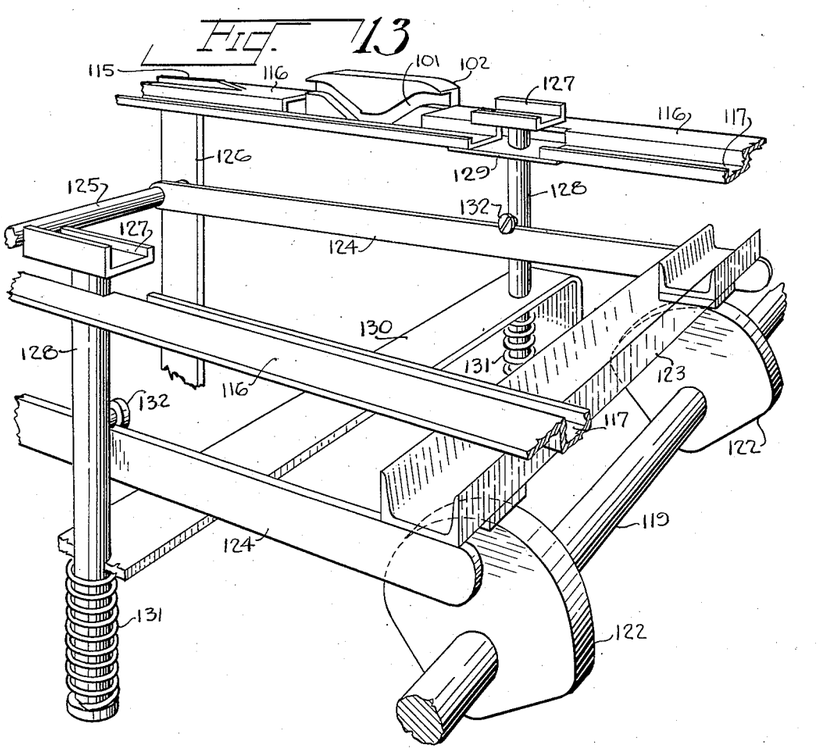
Fig. 13 is a fragmentary perspective view showing means for raising the carriers to the ice cream filling position.
Figure 14:
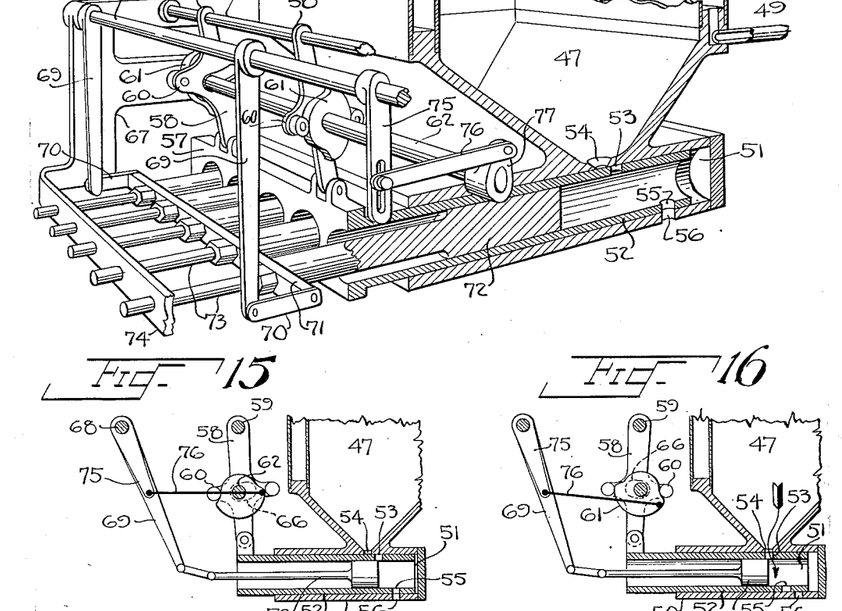
Fig. 14 is a perspective view including a section taken through one of the chocolate ejecting cylinders.
Figure 18:
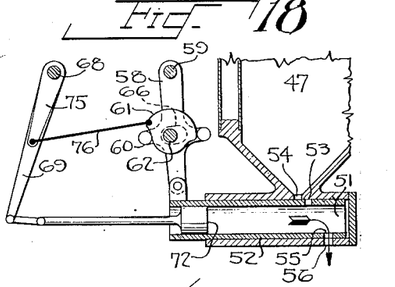
Fig. 18 shows the same parts with the intake port of the measuring compartment closed and the discharge port opened from which a definite quantity of molten chocolate is discharge into a paper mold positioned beneath the cylinder.
Figure 19:
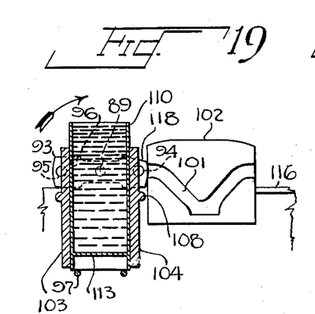
Figs. 19, 20, 21, 22, 23, 24 and 25 illustrate a modified form of carrier in which the paper molds are held to varying inclined positions during the draining period in order to insure a complete and uniform coating of the interior of the paper shell without the danger of smearing its edges or the mold support parts.
Figure 20:
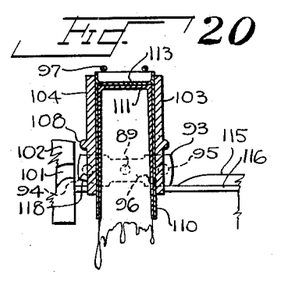

Between the drip pan 84 and its nearest shaft 34 is mounted a transverse shaft 119 which is under the ice cream hopper 85. The shaft 119 is driven by the chain 120 which passes around the sprocket 121. On the shaft 119 are the two cams 122 whose action can best be understood from Fig. 13. On the cams 122 rides the transverse channel 123 which is mounted on the arms 124 which, in turn, are pivoted on the rod 125 whose end is supported by the upright members 126.

Directly under the point at which the ice cream is to be inserted into the confections there is provided a detached section 127 in each of channels 117. Each section 127 is mounted on top of a slidable rod 128 whose upper end passes through a plate 129 on which the section 127 normally rests. The lower end of each rod 128 is guided by the bracket 130 beneath which is placed a spring 131 adapted to urge the members 128 downwardly. Each rod 128 is provided with a screw 132 which rests on the upper side of its adjacent arm 124.

The operation of the machine is as follows: It is assumed that the ice cream hopper is supplied with ice cream and that the chocolate hopper is supplied with chocolate, both materials being of a consistency which will permit same to be fed out by the normal operation of the machine. The operators now place the paper molds or shells 110 into the mold support, which may have any desired number of recesses formed therein. The mold support is then dropped into place in the carrier just above the shaft 34, and this operation is repeated as each carrier in turn comes up to the operator. The carriers which contain the empty paper molds now pass over the end of the machine and return in an inverted position to the rear end thereof, around which they can right themselves, and are now ready to receive the chocolate.

The ratchet wheel 46 is so positioned and the discharge openings of the chocolate and ice cream hoppers are so spaced that in its intermittent movement the conveyor stops each time with a set of molds with their open ends uppermost under the chocolate hopper and a second set of molds also having their open ends uppermost under the ice cream hopper. At this instant the discharge mechanism of the chocolate hopper forces a definite quantity of chocolate into each paper mold.

The conveyor now moves forward and the freshly filled molds are inverted, due to the passage of the pins 94 and 95 through the raceway 101, which pours out the bulk of the chocolate. As the travel continues by intermittent movements the inverted molds are held in a slightly inclined position so that the drip will occur at one edge of the mold only. By the time this set of molds has passed beyond the drip pan 84 all of the chocolate which will drip therefrom has been removed so that when the second block 102 again rights the molds, the last remaining drop of chocolate which failed to drop from the mold falls back to the inside of the chocolate cylinder.

Figure 1:
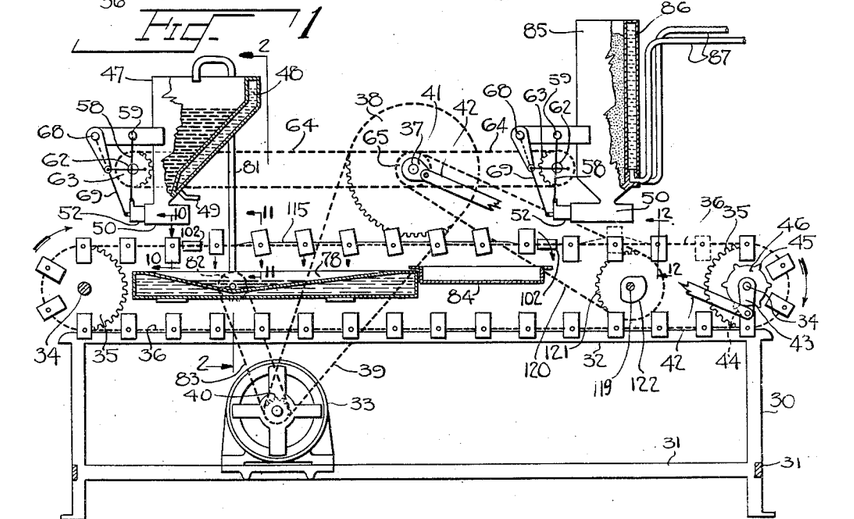
Fig. 1 is a diagrammatic view of the entire machine showing parts broken away in section.
Figure 2:
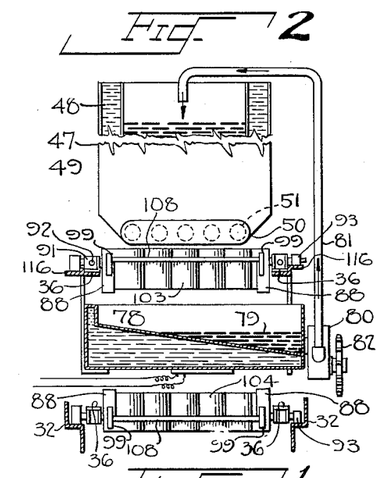
Fig. 2 is a transverse section through the machine taken along the line 2—2 in Fig. 1.
Figure 3:
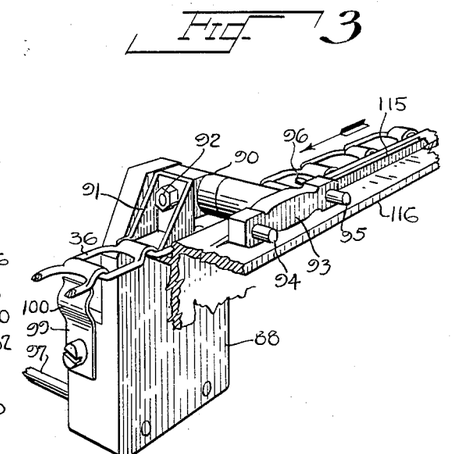
Figure 3 is a perspective view showing how the carrier brackets are secured to the chain.

The next step is the depositing of the particular carrier which we are following upon the sections 127, which permits the cams 122 to raise the carrier up underneath the ice cream filler, as shown in dotted lines in Fig 1.

Although the chocolate was still relatively soft up to the time the ice cream was inserted, it immediately congeals, and as the cam 122 permits the carrier to be lowered and its journey resumed the carrier is lifted off and another mold support with empty molds is substituted therefor.

It is obvious that while the course of one carrier only has been followed in detail, that the same is true of all of the sets of carriers.

It can be seen that by this method the necessity of providing artificial means for cooling the chocolate to a point where it can be easily handled is eliminated, since use is made of the fact that the filler itself, even in its semi-frozen state, is sufficiently cold to reduce the chocolate to an exceedingly firm condition. By inserting the ice cream in a relatively soft or semi-frozen condition it can be seen that it will completely fill the chocolate cylinder, which causes same to be reinforced thereby to a surprising extent when the final freezing operation is performed, which causes an additional slight expansion of the filling, whereas the chocolate cylinder is firmly confined within the paper mold whose tensile strength is relatively great.

While it is understood that the above-described process involves insertion of the ice cream into the chocolate cylinder it is also understood that in some instances it may be desirable to postpone the filling of the cylinders to a later time, in which case the ice cream filler would not be operated.

It is also obvious that by the utilization of a number of ice cream fillers in series, each one containing a different kind of ice cream, that the same can be formed in layers similar to the well known brick ice cream.

It will also be observed that the mold supports are open at both ends thus making it possible to fill the molds from the upper end and to release same from the lower end of their supports.

In the formation of a confection by the above-described process one of the greatest difficulties ordinarily encountered in the confectioner's art is overcome—and that is, when chocolate is employed for coating substances of various kinds (especially frozen substances) it is ordinarily quite difficult to secure a reasonable degree of uniformity in the thickness of said coating, due to the rapid transmission of heat from the chocolate to the filling, which causes the congealing of the chocolate to take place in a manner which is quite difficult to control. Even the employment of thermostats and other heat regulating devices fails to solve this problem. With this apparatus and process, however, the temperature of the filling does not in any way effect the thickness of the coating, this being controlled entirely by an easily governed factor, which is the consistency and temperature of the chocolate itself; whereas the temperature of the mold supports is normally that of the working temperature of the room in which the confections are made.

The greatest factor, however, in the production of a uniform coating of chocolate, partially or wholly, surrounding a frozen substance, is the elimination of the dipping operation, that is—the dipping of the frozen filling into melted chocolate. This is due to the fact that successive dipping of frozen masses of cream into molten chocolate not only tends to solidify the chocolate, but gradually and surely introduces a moisture content, which is very undesirable. The difficulties arising from the presence of moisture in chocolate is well understood by those versed in the confectioner's art.

By this process the chocolate which goes to make up the individual cylinder is separated from the main body of chocolate before it comes into contact with the cold cream, thereby positively preventing any dilution of the main chocolate body.

The object in raising the molds during the ice cream filling operation is to insure the complete filling and subsequent severing operation. Were this not done there would be sufficient rigidity in the ice cream to prevent the complete filling of the mold and the ribbons of cream would be dragged over the edges of the mold instead of broken as is the case when the molds are lowered.

We are aware that many kinds of confections have been produced in which a chocolate coating is employed. In some instances the chocolate is molded into cups by centrifugal means, after which the filling is inserted and at other times frozen or otherwise solid fillings are actually dipped into molten chocolate, in which case the chocolate completely surrounds the filling. This, experience has proven, is detrimental, especially for frozen confections, first, owing to the difficulty of securing uniformity in the coating, and second, on account of the impossibility for a dealer to know when his product is in a salable shape.

With this method the dealer places his completed confections in a suitable cold compartment and, if it appears that the frozen contents are beginning to soften or shrink he immediately drops the temperature to prevent any such further action. Where the chocolate completely confines the filling such preventive action is impossible, the discovery being made by the buyer when he bites into the confection which, if its filling is melted, causes same to escape in a manner which is very undesirable.

We claim:

1. A mold support consisting of a pair of frames hinged at opposite ends and having a plurality of cylindrical recesses formed between same, one half of each recess lying in each frame, said recesses having both of their ends open; in combination with a carrier frame to receive said mold support and hold its frames closed together.

2. A carrier for confection molds consisting of a U-shaped frame having a pivot at the top of each side thereof adapted to be mounted on conveyor chains and having a recess for the reception of a mold support, one of said pivots having a cross arm formed thereon and having a pair of outwardly projecting pins secured to said arm; a stationary cam adapted to engage said pins in a manner to revolve said support approximately to a vertical inverted position; a track engaging the under side of said arm when said pins are not passing through the race of said cam; a third pin in said arm; a raised track alongside of said first mentioned track upon which said third pin can ride for the purpose of inclining said carrier in a manner that the drip from its molds shall be directed to one side of the mold.

3. In a machine for making confections; an endless conveyor; means to move said conveyor; a mold carrier swivelly mounted on said conveyor; a mold holder detachably carried by said carrier; means for restraining said carrier against swivelling throughout a section of its path of travel; means operative throughout another section of its path of travel for inverting said carrier and maintaining it inverted a sufficient time to drain the mold; means operating at a further place in its path of travel for reverting said mold carrier; and means for supplying said mold with chocolate at a certain place in its path of travel.

4. In a machine for making confections; an endless conveyor; means to move said conveyor; a mold carrier swivelly mounted on said conveyor; a mold carried by said carrier; means for restraining said carrier against swivelling throughout a section of its path of travel; means operative throughout another section of its path of travel for inverting said carrier and maintaining it inverted a sufficient time to drain the mold; means operating at a further place in its path of travel for reverting said mold carrier; means for supplying said mold with chocolate at a certain place in its path of travel; and means to tilt said mold carrier in a backward direction while inverted to concentrate the drip at a definite place whereby when the carrier is reverting the last drop will fall inside the mold.

5. A mold support consisting of a pair of frames hinged at opposite ends and having a plurality of cylindrical recesses formed between same, one half of each recess lying in each frame, said recesses having both of their ends open; in combination with a carrier frame to receive said mold support and hold its frames closed together; said carrier frames including means to prevent the molds dropping out of said support while said support is in place on said carrier frames.

6. A machine for making confections having, in combination, a conveyor; a mold carrier mounted on said conveyor and adapted to hold a mold; a chocolate depositor for supplying the mold with chocolate; means for inverting said carrier and mold to effect drainage of surplus chocolate from the mold; and means for reverting said carrier and mold after the drainage is effected; and means for tilting said carrier and mold while inverted to concentrate the drip at one place.

7. A confection machine having a horizontal conveyor; a plurality of mold carriers mounted on said conveyor, a chocolate delivering mechanism mounted in cooperative relation with and at one place along said conveyor; an ice cream filling mechanism mounted over said conveyor at a place other than that where said chocolate delivering mechanism is located; means for rotating said mold carrier with respect to said conveyor after leaving said chocolate coating mechanism and continuing with the rotating movement until said mold carrier is erect under said ice cream filling mechanism to drain the molds of surplus chocolate and prepare them to receive the ice cream, and means for raising said carrier above its normal path of travel while under said ice cream filling mechanism for the purpose specified.

8. A confection machine having a horizontal conveyor; a plurality of mold carriers mounted on said conveyor; a chocolate filling mechanism mounted over said conveyor; an ice cream filling mechanism mounted over said conveyor at a different position from that of said chocolate filling mechanism; means for moving said conveyor to advance said mold carriers from beneath said chocolate filling mechanism to beneath said ice cream filling mechanism; means for inverting said mold carriers before they reach said ice cream filling mechanism, means for tilting said mold carriers backwardly after passing said chocolate filling mechanism, and means for rotating said mold carriers forward in the direction of their inverting movement to revert the same before arriving beneath said ice cream filling mechanism substantially as shown and described.

WILSON R. MYERS.
BERNHARD O. OPITZ.